No. 708,717. Patented Sept. 9, 1902.
C. L. KENNICOTT.
WATER PURIFYING APPARATUS.
(Application filed May 9, 1902.)
(No Model.)
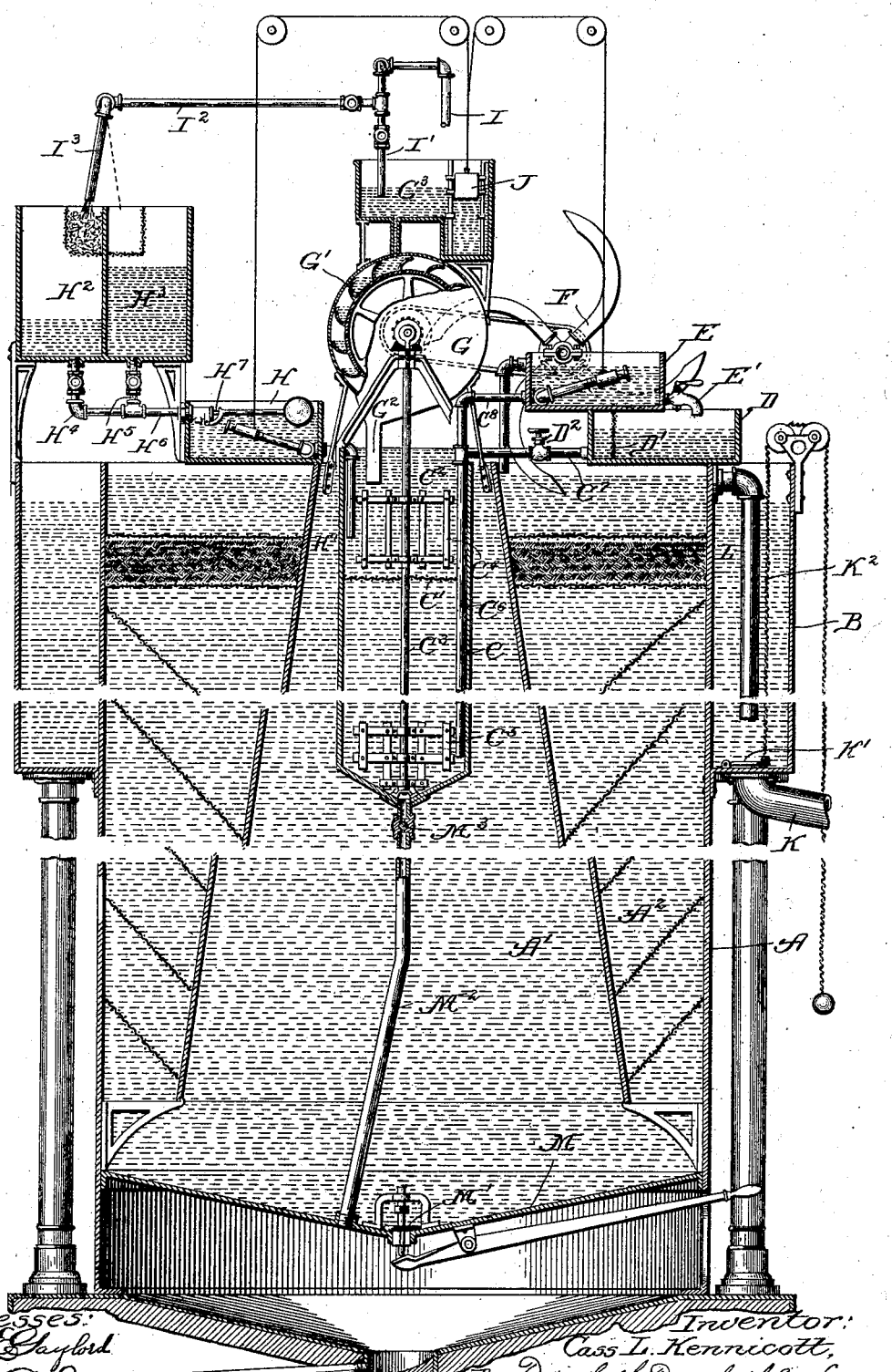

UNITED STATES PATENT OFFICE.

CASS L. KENNICOTT, OF CHICAGO, ILLINOIS, ASSIGNOR TO KENNICOTT WATER SOFTENER COMPANY, OF CHICAGO, ILLINOIS, A CORPORATION OF ILLINOIS.

WATER-PURIFYING APPARATUS.

SPECIFICATION forming part of Letters Patent No. 708,717, dated September 9, 1902.

Application filed May 9, 1902. Serial No. 106,661. (No model.)

*To all whom it may concern:*

Be it known that I, CASS L. KENNICOTT, a citizen of the United States, residing at Chicago, in the county of Cook and State of Illinois, have invented a new and useful Improvement in Water-Purifying Apparatus, of which the following is a specification.

My invention relates particularly to water-purifying apparatus employed for treating "hard" water chemically to form insoluble compounds which will be deposited as precipitates that can be removed at will.

The present invention is in the nature of an improvement on the apparatus described in my allowed application, Serial No. 72,665, filed August 20, 1901; and the object of the invention is to provide for more thorough mixing of the hard water and the chemical agents, as well as to make further provisions against freezing.

My improvements are illustrated in the accompanying drawing, which represents a broken vertical section of apparatus embodying said improvements.

The preferred construction is as follows:

A represents a precipitating-tank having a downwardly-flaring downtake-conduit $A'$ and an upwardly-enlarging uptake-conduit $A^2$; B, an annular soft-water-storage tank surrounding the upper portion of the tank A; C, a chemical-solution (lime-water) tank located in the upper portion of the conduit $A'$ and divided by a screen $C'$ to afford at its upper portion a mixing-chamber $C^2$; $C^3$, a vertically-disposed stirrer-shaft located in the tank C and equipped with upper and lower stirrers $C^4$ $C^5$, respectively; $C^6$, a pipe leading to the bottom of the tank C and having at its upper end branch pipes $C^7$ $C^8$; D, a lime-slaking tank where charges of milk of lime are prepared and which communicates with the branch pipe $C^7$; $D'$, a screen for the tank D; $D^2$, a valve for the pipe $C^7$; E, a soft-water tank supplied with a discharge-faucet $E'$ and in communication with the branch pipe $C^8$; F, a water-lift for raising soft water from the upper portion of the conduit $A^2$ to the tank E; G, a water-wheel casing containing a water-wheel $G'$ and having a discharge-spout $G^2$; $G^3$, a hard-water tank; H, a chemical-solution (soda-solution) tank having a discharge-pipe $H'$ opening into the chamber $C^2$; $H^2$ $H^3$, alternately-used charge-preparing tanks communicating, respectively, through branch pipes $H^4$ $H^5$ with a pipe $H^6$, communicating with the tank H; $H^7$, a float-controlled valve controlling the admission to the tank H; I, a supply-pipe receiving water from a hydrant or other supply source (not shown) and having a branch $I'$, supplying the tank $G^3$, and a branch $I^2$, terminating in a swinging section $I^3$, supplying the tanks $H^2$ $H^3$; J, a float which regulates in a manner now well understood the outlets from the tanks E and H; K, a discharge-pipe connected with the tank B; $K'$, a valve controlling the discharge through the pipe K and equipped with a chain $K^2$, passing over a pulley $K^3$ at the top of the tank B; L, an overflow-pipe for the tank A, having its discharge end located adjacent to the valve K; M, a bottom for the tank A, supplied with a valve $M'$; $M^2$, a discharge-pipe connected with the bottom of the tank C and passing through the bottom M, and $M^3$ a valve for the pipe $M^2$.

The general operation of similar machines is well understood, and a brief description of the operation of the improved machine will suffice. The water-wheel is turned by the water entering the machine and in turn operates the shaft $C^3$ and the lift F. In practice the head of water in the tank J varies, and the head of pressure acting at the discharges of the tanks E and H is automatically varied correspondingly. As required, charges of milk of lime are prepared at the tank E (water being drawn through a faucet $E'$) and admitted to the bottom of the tank C through the pipe $C^6$. Soft water presses continually through the pipe $C^6$ and dissolves the lime in suspension at the bottom of the tank C, forming clear lime-water, which wells up through the sieve $C'$. In the chamber $C^2$ the lime-water, the soda solution, and the hard water meet and are thoroughly mixed by the stirrer $C^4$. Chemical combinations are readily effected under such conditions, and the mixture overflows into the conduit $A'$, where the settling mainly takes place. The water finally passes up through screens and a filter in the conduit A² and overflows through the pipe L, continually washing the valve K' and preventing freezing thereat. The tank B is drawn upon at will as soft water is required for boiler purposes or for other use. The tank A usually varies in height from fifteen feet to forty feet, and the tanks B and C usually are of about one-half the depth of the tank A.

What I regard as new, and desire to secure by Letters Patent, is—

1. In apparatus of the character described, the combination of a precipitating-tank, a chemical-solution tank therein having its upper portion serving as a mixing-chamber and provided with an overflow into said precipitating-tank, and a water-supply source with a discharge opening into said mixing-chamber.

2. In apparatus of the character described, the combination of a precipitating-tank, a chemical-solution tank therein having its upper portion serving as a mixing-chamber and provided with an overflow into said precipitating-tank, a water-supply source with a discharge opening into said mixing-chamber, and a second chemical-solution tank with a discharge opening into said mixing-chamber.

3. In apparatus of the character described, the combination of a precipitating-tank, a chemical-solution tank therein having its upper portion serving as a mixing-chamber and provided with an overflow into said precipitating-tank, a water-supply source with a discharge opening into said mixing-chamber, a second chemical-solution tank with a discharge opening into said mixing-chamber, and stirrers for the lower portion of said first-named chemical-solution tank and said mixing-chamber.

4. In apparatus of the character described, the combination of a precipitating-tank, a chemical-solution tank equipped with a horital screen near its upper end and divided thereby to afford a mixing-chamber above said screen, means of admitting liquid to said chemical-solution tank beneath said screen, and a water-supply source discharging into said mixing-chamber.

5. In apparatus of the character described, the combination of a precipitating-tank, a chemical-solution tank having its upper portion serving as a mixing-chamber and provided with an overflow into said precipitating-tank, an elevated source of supply connected with the lower portion of said second-named tank, a hard-water-supply source discharging into said mixing-chamber, and a second chemical-solution tank discharging into said mixing-chamber, for the purpose set forth.

6. In apparatus of the character described, the combination of a precipitating-tank, a chemical-solution tank, a charge-preparing tank communicating through a valved pipe with the lower portion of said chemical-solution tank, a soft-water tank communicating with the lower portion of said chemical-solution tank, and a source of hard-water supply, for the purpose set forth.

7. In apparatus of the character described, the combination of a precipitating-tank, a chemical-solution tank, a charge-preparing tank communicating through a valved pipe with the lower portion of said chemical-solution tank, a soft-water tank communicating with said valved pipe, a source of hard-water supply discharging into the upper portion of said chemical-solution tank, and a second chemical-solution tank discharging into the upper portion of said first-named chemical-solution tank, the overflow passing into said precipitating-tank, for the purpose set forth.

8. The combination of a precipitating-tank, a hard-water source, a chemical source, a soft-water-storage tank having a closed discharge-valve, and means for directing the water from the precipitating-tank upon said valve, for the purpose set forth.

9. The combination of a precipitating-tank, a hard-water source, a chemical source, an annular soft-water-storage tank encircling the precipitating-tank and having a closed discharge-valve, and an overflow-pipe leading from the upper portion of said precipitating-tank to a point adjacent to said valve, for the purpose set forth.

CASS L. KENNICOTT.

In presence of—
L. HEISLAR,
ALBERT D. BACCI.